(12) United States Patent
Langford

(10) Patent No.: US 6,507,911 B1
(45) Date of Patent: Jan. 14, 2003

(54) SYSTEM AND METHOD FOR SECURELY DELETING PLAINTEXT DATA

(75) Inventor: Glenn C. Langford, Kanata (CA)

(73) Assignee: Entrust Technologies Limited, Ottawa (CA)

( * ) Notice: Subject to any disclaimer, the term of this patent is extended or adjusted under 35 U.S.C. 154(b) by 0 days.

(21) Appl. No.: 09/120,709

(22) Filed: Jul. 22, 1998

(51) Int. Cl.[7] .................................................. H04L 9/00
(52) U.S. Cl. ...................................................... 713/193
(58) Field of Search ................................ 713/193, 189, 713/165, 164, 150

(56) References Cited

U.S. PATENT DOCUMENTS

| | | | |
|---|---|---|---|
| 5,193,184 A | * 3/1993 | Belsan et al. ................... | 711/4 |
| 5,835,601 A | * 11/1998 | Shimbo et al. ................. | 713/165 |
| 5,991,778 A | * 11/1999 | Starek et al. .................. | 707/205 |
| 6,016,507 A | * 1/2000 | Carroll et al. ................. | 709/217 |
| 6,070,147 A | * 5/2000 | Starek et al. .................. | 707/206 |

\* cited by examiner

*Primary Examiner*—Albert Decady
*Assistant Examiner*—Matthew Smithers
(74) *Attorney, Agent, or Firm*—Vedder, Price, Kaufman & Kammholz (57) ABSTRACT

A data deletion system and method detects data deletion notification data representing a desire to delete data, such as a data delete command from a storage management system such as an operating system or other software application. The system and method provides a system invoked deletion process that modifies the desired data to be deleted in response to the detected data deletion notification data. The system does not require continued user invocation to select data to be deleted. Modification of the desired data to be deleted includes actual deletion of the information by overwriting the desired data to be deleted with random data or other process such as overwriting original data multiple times, to ensure that there is no detectable electronic signature of the original data.

35 Claims, 8 Drawing Sheets

SYSTEM AND METHOD FOR SECURELY DELETING PLAINTEXT DATA

BACKGROUND OF THE INVENTION

The invention relates generally to data deletion systems and methods, and more particularly to data deletion systems and methods employing data overwrite techniques and/or data encryption.

When deleting data, such as computer files or other information, today's computer systems typically require a user to manually select data, such as a file or files, which are to be deleted. Typical deletion systems and methods provide some sort of temporary storage (sometimes referred to as "recycle bins") to allow later recovery of a deleted file in the event that the user inadvertently deleted the information. The data to be deleted that is identified in the temporary storage or recycle bin may then be "deleted" by a user when a user selects a file deletion process. However typical deletion systems do not actually physically delete the information but instead simply mark what file is no longer needed and the file's location in the file system so that the location is available for new data. The file allocation table (FAT) typically points to a place on a disk where a file is located and the operating system or other management system marks a file allocation table having pointers indicating that the location is free for later storage of other information. Hence the data to be "deleted" is not typically physically removed from the disk when a final delete or deletion process is activated, directly or indirectly by a user. By simply marking the allocated storage as free for use, the overhead on the system is typically minimized. However for sensitive information, this approach may be undesirable because the data can be recovered easily by off the shelf utilities in case of accidental deletion, or by an attacker desiring access to the sensitive information.

To overcome this problem, some encryption systems encrypt a copy of the document, file or data to be "deleted" and stored in the recycle bin so that the information is securely recoverable only by the user to prevent an attacker from readily obtaining sensitive information from the recycle bin. However, such known systems are user invoked secured deletion systems which requires a user to select an individual file, or group of files that need to be securely deleted in interim storage. Such systems may also typically overwrite the original document with random data or fixed data patterns to ensure secure deletion of plaintext data while storing an encrypted copy in the recycle bin for later retrieval if desired. However such stand alone user invoked deletion systems place the burden on the user to invoke a secure deletion process. This becomes a problem when voluminous amounts of data must be deleted. Also, some sensitive files are transparently created by a system in the background and are generated by software applications as they are running so that such files are not typically available to be user selected to be overwritten.

Other known deletion systems and methods overwrite the plaintext data with random data so that no data can be recovered even if it employs a file allocation table pointer system. However, as with other known systems, such data overwriting systems are typically user invoked requiring a user to manually select each file that must be deleted. Therefore, sensitive files may be accidentally missed by a user and files that are automatically generated by a utility or software program may not be selected for deletion.

Consequently, there exists a need for an improved data deletion system and method that facilitates system invoked physical deletion of information either by overwriting the data and/or securely encrypting the data without requiring user invocation.

BRIEF DESCRIPTION OF THE DRAWINGS

FIG. 1c is a flowchart generally illustrating the operation of the data deletion system of FIG. 1a;

FIG. 2b is flowchart representing an example of the operation of the data deletion system of FIG. 2a;

FIG. 3b is a flowchart illustrating the operation of the data deletion system of FIG. 3a;

DETAILED DESCRIPTION OF THE INVENTION

A data deletion system and method detects data deletion notification data representing a desire to delete data, such as a data delete command from a storage management system such as an operating system or other software application. The system and method provides a system invoked deletion process that modifies the desired data to be deleted in response to the detected data deletion notification data The disclosed invention does not require continued user invocation to select data to be deleted. In addition, the disclosed system and method may be employed as part of an operating system, or as a stand alone deletion engine that can be integrated into existing operating systems. Modification of the desired data to be deleted includes actual deletion of the information by overwriting the desired data to be deleted with random data or other process such as overwriting original data multiple times, to ensure that there is no detectable electronic signature of the original data.

In an alternative embodiment, the deletion of data includes encrypting the desired data to be deleted, overwriting the desired data to be deleted, and then storing the encrypted data for later recovery using public key encryption/decryption techniques or other suitable encryption/decryption techniques.

The system may employ, if desired, storage media status detection to automatically reconfigure when a new writable storage device is added to the system or if such a device is removed from the system. Hence, the data deletion system and method automatically keeps track of changes so that user invocation is not continuously required. In yet another embodiment, a network based data deletion system is employed that utilizes a centralized deletion control data provider that provides deletion control data to nodes within the system. The deletion control data may include for example, memory identification data, directory identification data, security degree data and encryption enabling data, so that a node, such as a computer or a software application, may be directed to perform the appropriate deletion process whether it be overwriting information or encrypting and overwriting information or any other suitable deletion process. In this way, centralized control for a number of nodes can be facilitated so that sensitive information can and will always be deleted in a manner directed by a centralized authority. The deletion control data may be communicated in any suitable form including through the use of trusted certificate information.

Also if desired the system provides a selectable deletion application mechanism which may apply the deletion process to a specific group of files, directories or other data category as determined by the centralized authority or by a user, if desired.

Figure 1A:
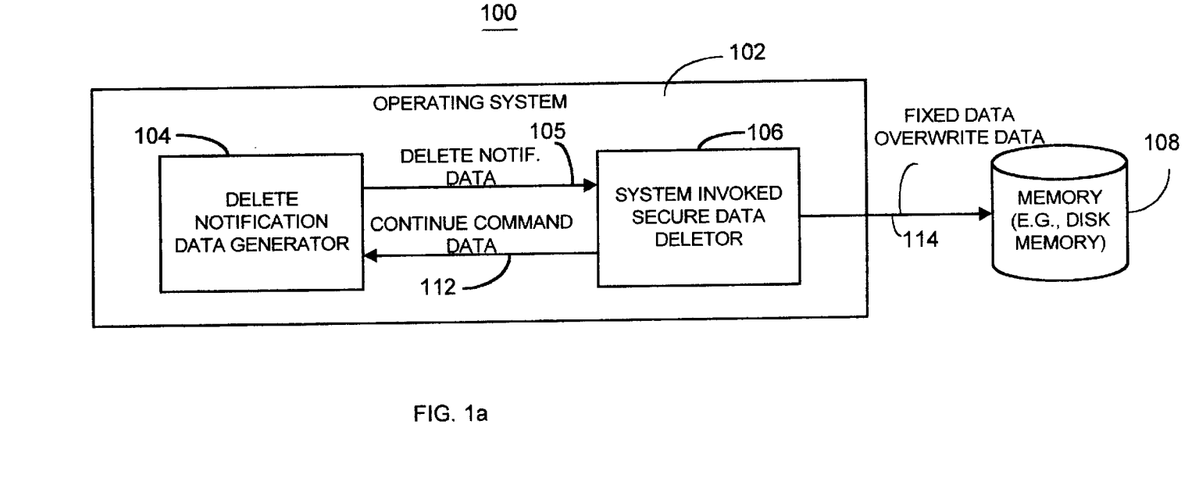
FIG. 1a is a block diagram generally illustrating one embodiment of a data deletion system in accordance with the invention.

FIG. 1a shows an embodiment of a data deletion system 100 employed as part of a computer operating system 102 such as a Microsoft® Windows based operating system. As known in the art, such operating systems provide "hooks" which are entry points within the operating system that may be accessible to other applications that interface with the operating system. Such operating system hooks are provided for the deletion operation and other file system operations so that another application can monitor that a deletion process is being carried out by the operating system. In such systems, as previously mentioned, typical deletion processes include user invoked "deletion" that merely updates the file allocation table (or a similar data structure maintained by the file system to manage disk storage) without overwriting the data to be deleted. Hence the conventional operating systems typically include a delete notification generator 104 that generates a delete notification signal 105 typically in the form of a bit in a register indicating that a deletion has been requested by a user. The data deletion system 100 includes a system invoked secure data deletor 106 that has access to memory 108 containing files to be deleted. The system invoked secure data deletor may be implemented as a software program that controls a central processing unit of a computer. It may also be any other suitable software or hardware device.

The system invoked secure data deletor receives the delete notification signal 105 from the delete notification generator 104 wherein the data deletion notification data represents a desire of an application or user to delete data. The system invoked secure data deletor 106 automatically deletes data without continuous user invocation of the deletion process. The system invoked secure data deletor 106 automatically deletes data each time data deletion notification data is generated so that even when files are being deleted automatically by applications, the deletor suitably deletes files as further described below to ensure a physical deletion of information and secure deletion of information when desired. On completion of its deletion process (preprocess), the system invoked secure data deletor 106 generates a continue command 112 back to the deletion notification generator 104 to inform the generator 104 that a subsequent deletion process may continue, such as updating of the file allocation table or other suitable subsequent deletion related activity.

Figure 1B:
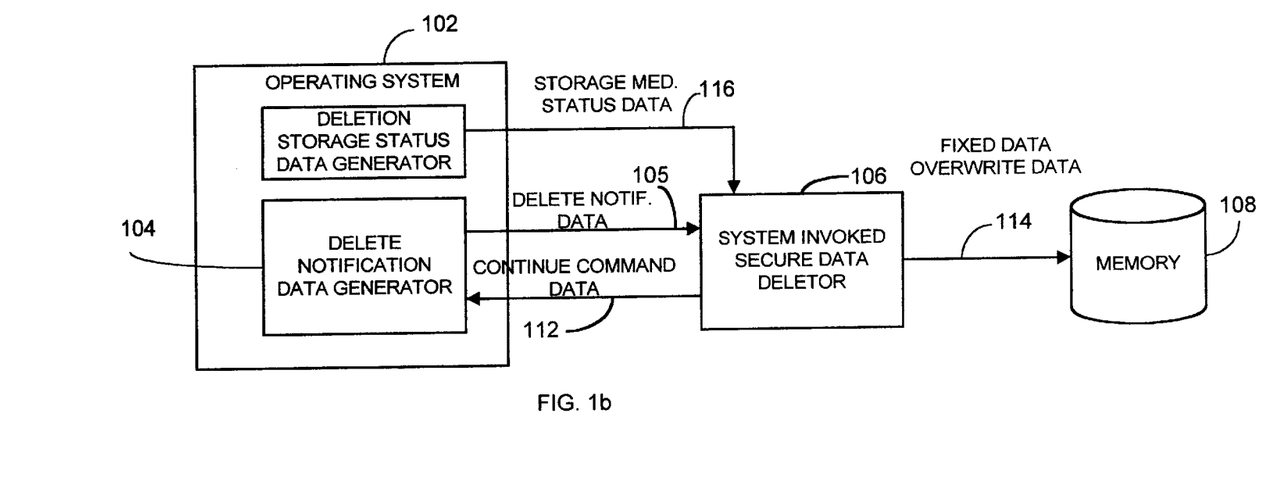
FIG. 1b is a block diagram illustrating an alternate embodiment of a data deletion system in accordance with the invention.

FIG. 1b shows an alternative embodiment wherein the system invoked secure data deletor 106 is an operating system extension to operating system 102 instead of being incorporated into the operating system as shown in FIG. 1a. As shown, a system invoked secure data deletor 106 generates overwrite data 114 to overwrite the data desired to be deleted in memory 108. In addition, the operating system 102 provides storage media status data 116 that represents usable storage media such as a new disk drive that allows overwriting of data to facilitate deletion of data. In this way the system invoked secure data deletor 106 has up to date information on whether or not additional storage media may have been added or removed from the system. The storage media status data 116 may be derived from any suitable mechanism from the operating system including file system notification data indicating new or removed storage media.

Figure 1C:
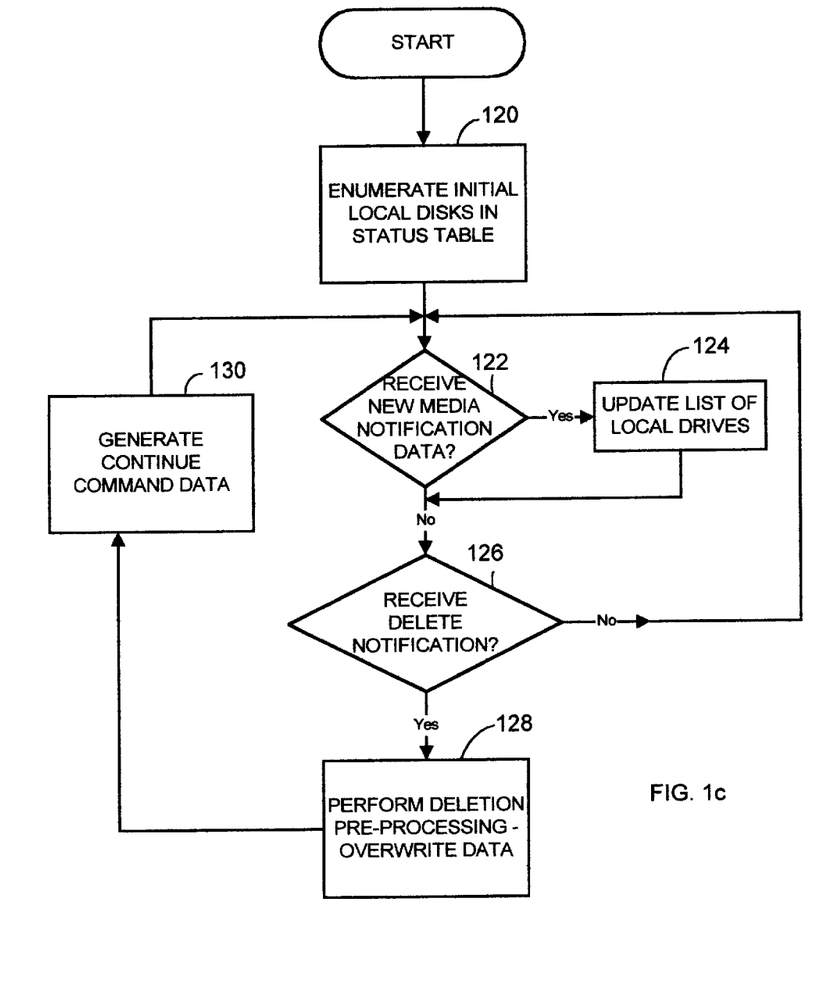

FIG. 1c shows one example of the operation of the system of FIGS. 1a and 1b wherein the system invoked secure data deletor 106 obtains the defined addresses and other necessary information to facilitate the deletion hook into the operating system. As shown in block 120, the storage media status generator generates the status of the computer storage medium in the system invoked secure data deletor 106 and determines the number of writable media from the generated storage media status data. The system invoked secure data deletor then determines whether it has received new storage media status data 116 as shown in block 122. If new storage media status data has been received, the system invoked secure data deletor 106 updates its list of local drives to include any new or removed media as shown in block 124. If no new storage media status data has been received, the system invoked secure data deletor 106 determines whether it has received deletion notification data as shown in block 126. If it detects data deletion notification data from the delete notification generator 104, the system invoked secure data deletor 106 performs deletion preprocessing such as overwriting of the data to be deleted, as shown in block 128. In effect, the system invoked secure data deletor 106 intercepts a data deletion notification signal (see FIG. 1b) from the operating system and then places the operating system's deletion process on hold until the deletion process invoked by the system invoked secure data deletor 106 has been completed. In one embodiment, the system invoked data deletion process modifies the desired data to be deleted in response to the detected data deletion notification information by overwriting the desired data to be deleted using a random number generator. In addition, other overwrite algorithms may be used including a multiple write algorithm as known in the art. Hence the overwriting of the desired data may be an overwriting of the data a plurality of times to ensure no electrical signature of the original data can be readily deciphered by an attacker.

Once the system invoked secure data deletor 106 overwrites (deletes) the information it generates a continue command 112 as shown in block 130. The system invoked secure data deletor 106 continues to automatically invoke the deletion process each time a deletion notification is generated.

Referring back to FIG. 1b, the operating system may have its own deletion process such as updating a file allocation table. The system invoked secure data deletor 106 employs a deletion preprocessing method to overwrite the data. Hence the operating system is considered to have a deletion system and the system invoked secure data deletor is considered to be a second deletion system. As such, the disclosed invention may be employed on existing operating systems without affecting their current deletion processes while enhancing the security of the overall system.

Figure 2A:
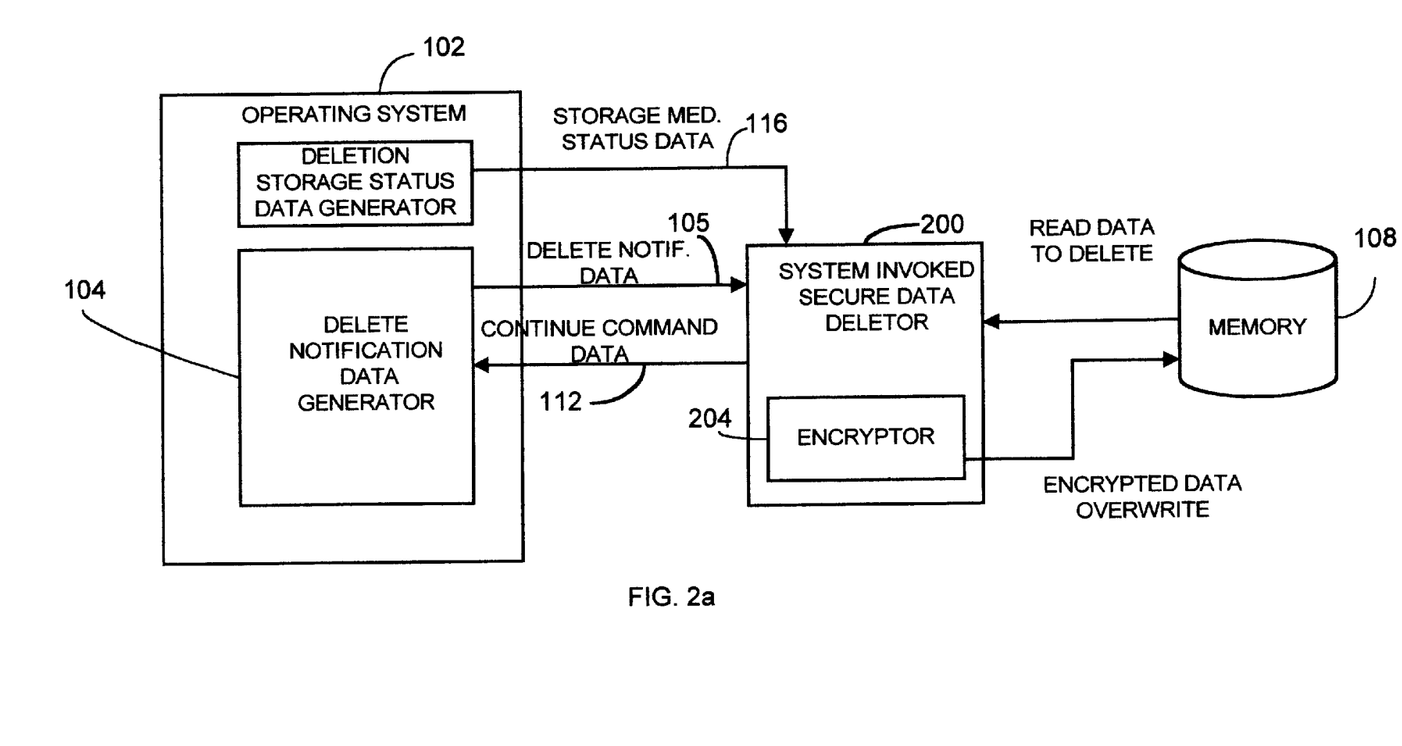
FIG. 2a is a block diagram generally illustrating an alternative embodiment of a data deletion system in accordance with another embodiment of the invention.

FIG. 2a shows a similar structure of a deletion system as that shown in FIG. 1b except that the system invoked secure data deletor 200 performs an encrypted overwrite deletion process instead of a fixed data overwrite process as previously described. In this embodiment the system invoked secure data deletor 200 reads the desired data from memory 108, encrypts the data to be deleted using an encryption key, such as a symmetric key (which is then wrapped using a suitable public encryption key) and overwrites the original data in the file with the encrypted data In this way the original data no longer exists in plaintext form so that an attacker may not readily obtain the information from the memory 108. Moreover the data is overwritten with an encrypted version of the original data so that only the user with a private decryption key can obtain the information. As with the previous embodiments, the system invoked secure data deletor 200 automatically detects a deletion command from the operating system and performs the encrypted overwrite operation without requiring user invocation so that pre-selected file types or directories are automatically deleted with the encrypt overwrite process automatically. Any files generated by applications that are not available to the user are also automatically deleted using the encrypted overwrite process.

Figure 2B:
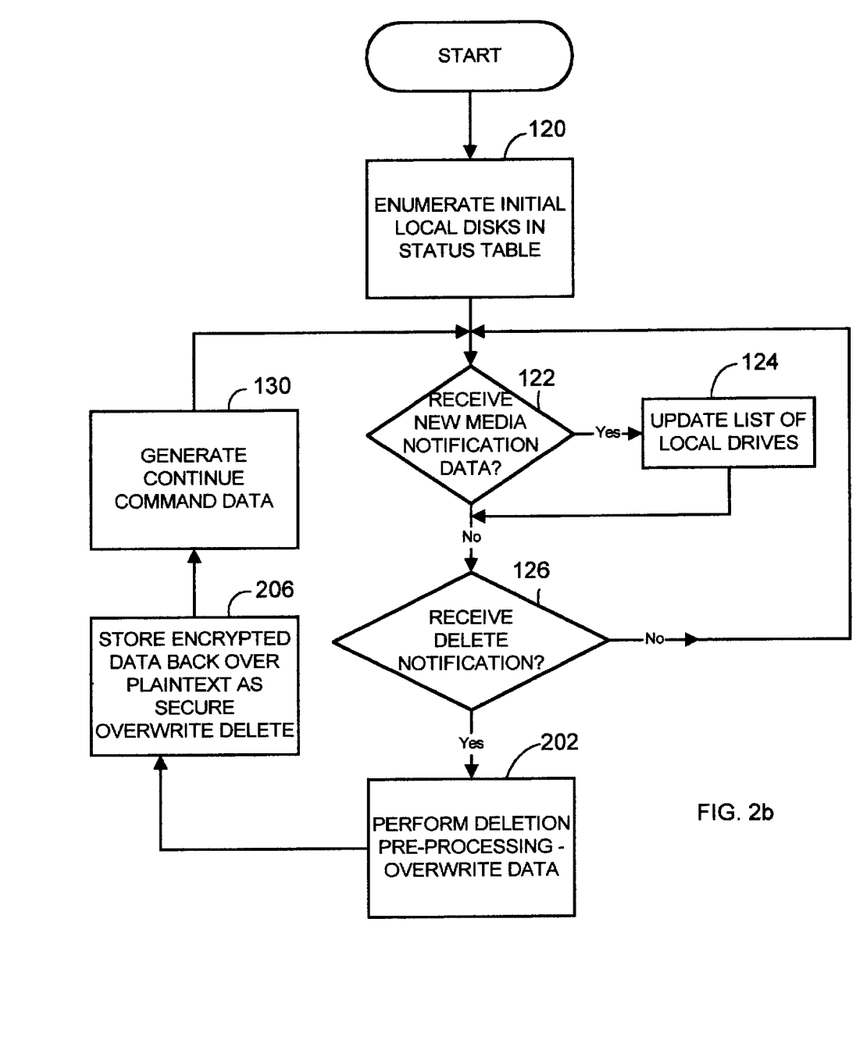

FIG. 2b shows the operation of the system of FIG. 1a where the same steps as previously described with respect to FIG. 1c are carried out by the system invoked secure data deletor 200 as indicated by use of the same reference numerals. However, after detection of a deletion notification, as shown in block 202, the system invoked secure data deletor 200 performs deletion preprocessing by reading the desired data to be deleted from the memory 108 and encrypts the data using a suitable encryption key using the encryptor 204. The encryptor 204 may be any suitable encryption algorithm including a symmetric key process, a public key encryptor employing an RSA encryption process or elliptic curve process, or any combination of these encryption processes, or any other suitable encryption process. As shown in block 206, the system invoked secure data deletor 200 stores the encrypted data back over the plaintext data to overwrite the original data to avoid easy detection by an attacker. As known in the art, additional information as necessary to allow decryption by an authorized user with the proper decryption key, such as a wrapped symmetric key, may also be stored along with the encryption data. As shown in block 130, the system invoked secure data deletor then generates the continue command data notifying the operating system to continue its deletion process.

Figure 3A:
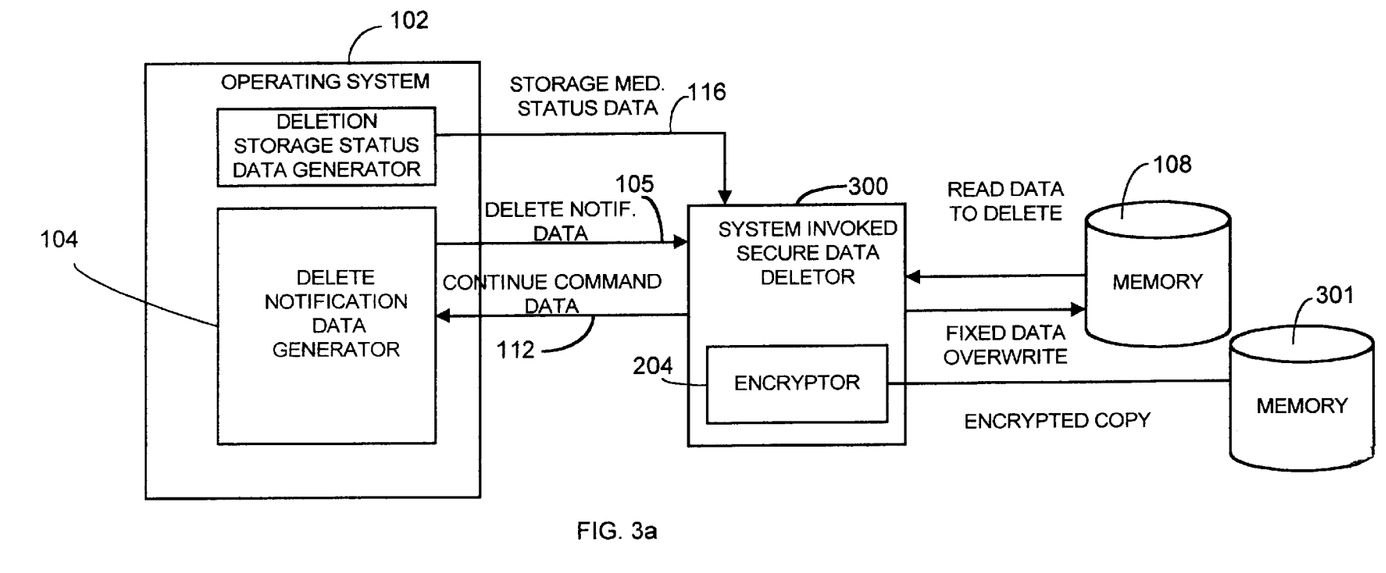
FIG. 3a is a block diagram of a data deletion system in accordance with another embodiment of the invention.

FIG. 3a shows yet another embodiment of a deletion system employing a system invoked secure data deletor 300. The system invoked secure data deletor 300 is the same as the system invoked secure data deletor shown in FIG. 2a (200) except that the system invoked secure data deletor 300 employs fixed data overwrite on the data that is desired to be deleted after data is read and encrypted. The encrypted file is then stored at another location 301 in an encrypted form so that the information can be recovered if desired.

Figure 3B:
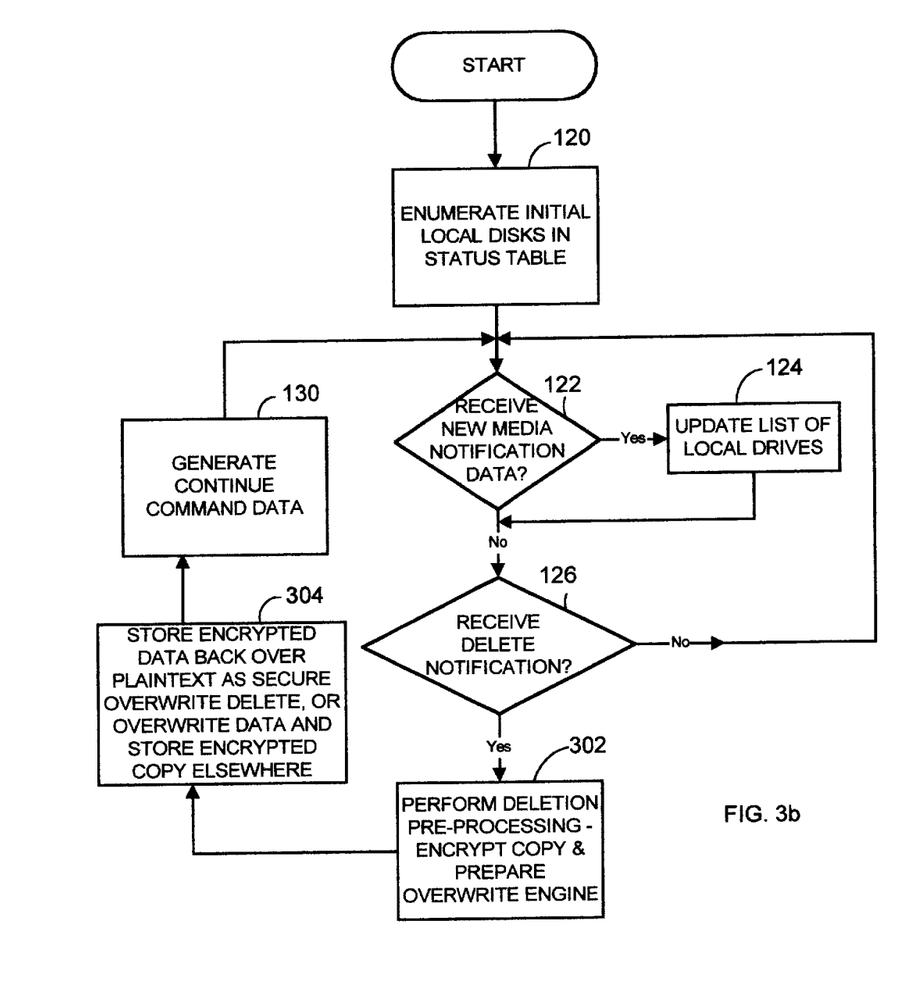

FIG. 3b shows the operation of the system of FIG. 3a which is the same as that previously described with respect to FIG. 2b except that the deletion preprocessing includes an encryption and fixed data overwrite of the original file as shown in block 302. As shown in block 304, the encrypted file is stored in another memory location 301 and may be used to overwrite the original data, or a fixed data overwrite may also be used.

With respect to each of the above embodiments, a graphic user interface is preferably used to allow a user to select which deletion preprocessing mechanism to use. For example, a user is provided with a menu at the start of the running of the system invoked deletion process which allows the user to select simple overwrite, encryption overwrite and/or encryption and fixed data overwrite. This is referred to herein as deletion control data. A system invoked secure data deletor receives the deletion control data and selects the appropriate deletion process to be used for that particular user. The control data may be memory identification data, such as data representing a particular disk drive so that all files stored on the disk drive are deleted according to the selected deletion preprocessing mechanism. Similarly the control data may include directory identification data, such as data representing specific directories selected by the user so that all files stored in those directories, and data stored in those directories, are deleted according to the selected deletion preprocessing mechanism.

Other control data may include, for example, security degree data, such as data representing the degree of security desired by a user. For example if a user wishes to have a lower security system, the encryption key used by the encryptor 204 may be a shorter encryption key compared with a longer encryption key if a higher degree of security is required. Also, the security degree data may indicate the number of passes of overwrites so that a low degree of security would only overwrite the data once where as a higher degree of security may overwrite the data two or more times. Also, desired control data may include encryption enabling data which allows the user to select whether the system invoked secure data deletor should employ encryption to encrypt and save a copy of the file for later recovery. In such an embodiment the system invoked secure data deletor may be controlled on a non-centralized basis, such as on a per node or per software application basis.

Figure 4:
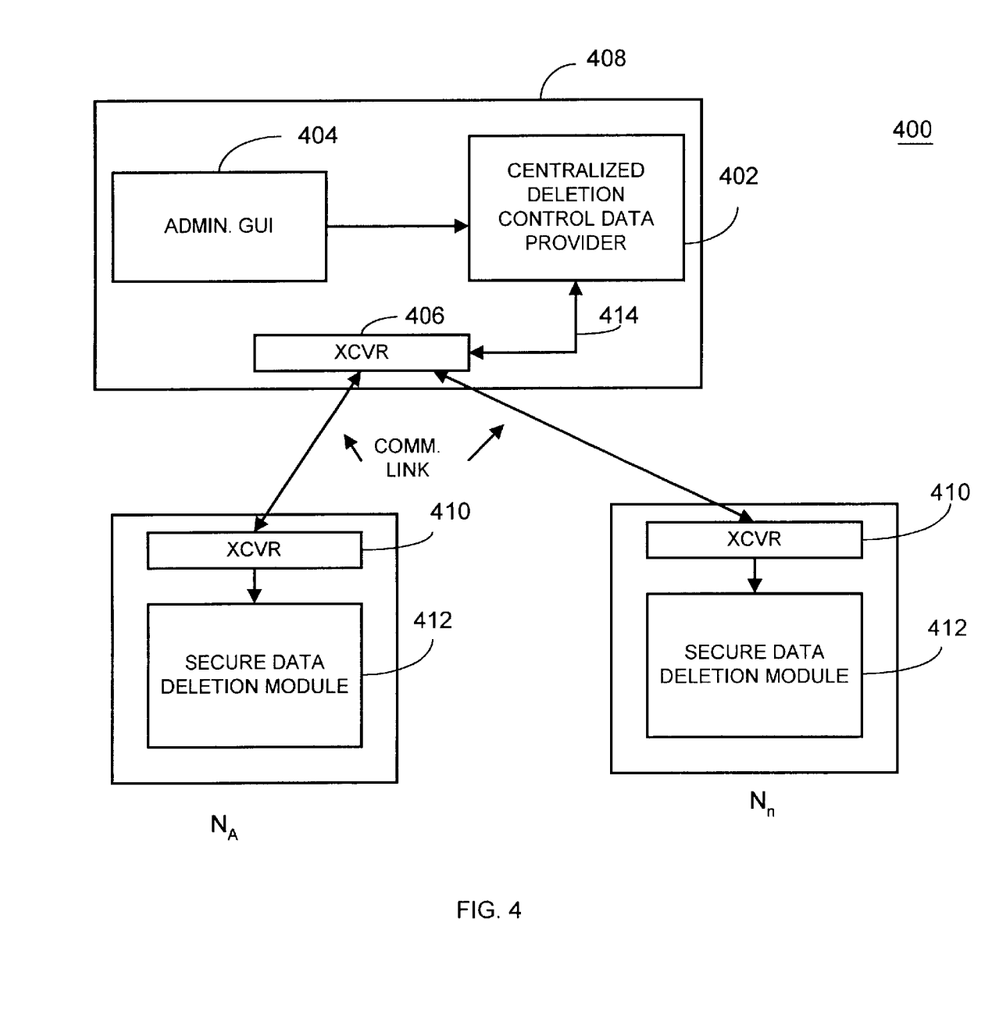
FIG. 4 is a block diagram illustrating a data deletion system employed in a computer network environment in accordance with one embodiment of the invention.

FIG. 4 shows another embodiment of a deletion system 400 having a centralized deletion control data provider 402, a graphic user interface 404 and a transceiver 406 used as part of a server 408. The server 408 is coupled to a plurality of nodes NA through Nn through a suitable communication link. Each node may include for example a transceiver 410 such as a modem, and a secure data deletor 412 such as any of those previously described with respect to FIGS. 1 through 3. In this embodiment, deletion control data 414 is communicated with other data if desired between the centralized deletion control data provider 402 and a respective node through any suitable communication link. Preferably, the deletion control data 414 is embedded in a trusted attribute certificate as part of policy data. Such a system may be employed for example in a public key encryption system that employs trusted certificates. As such, the node has the appropriate verification and certificate analysis systems embodiment therein as known in the art. The deletion control data 414 may include the data previously described, such as memory identification data, directory identification data, security degree data, and encryption enabling data or any data useful in identifying or controlling data to be deleted.

Figure 5:
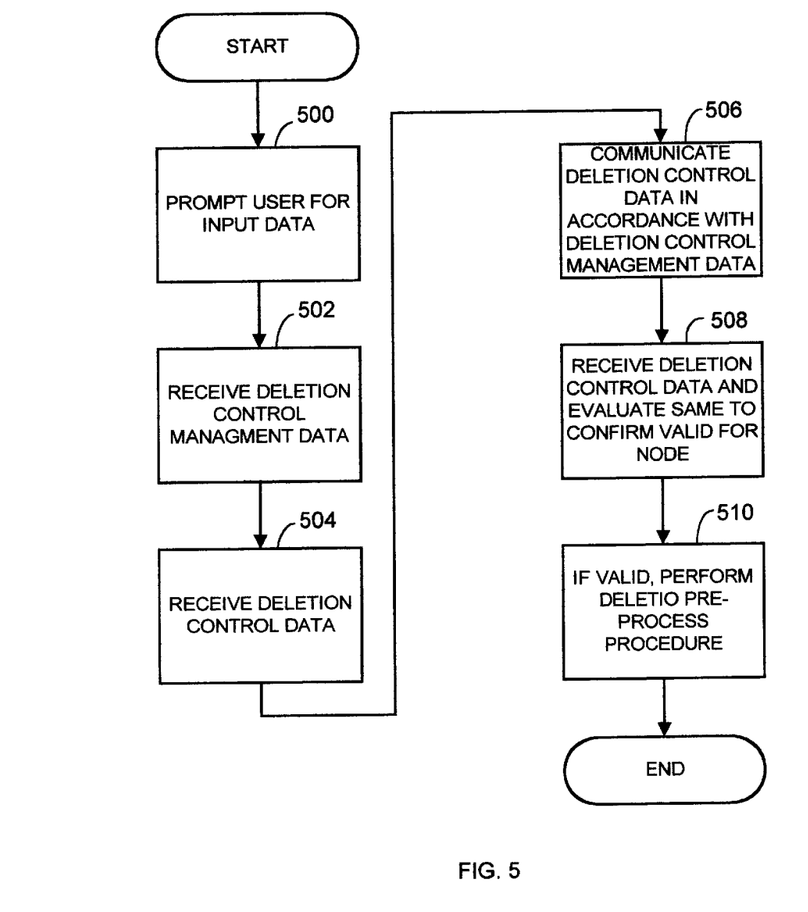
FIG. 5 is a flowchart generally illustrating the operation of the network data deletion system shown in FIG. 4.

FIG. 5 shows the operation of a network system of FIG. 4 which begins by the graphical user interface 404 prompting a user, such as security personnel to select the suitable deletion control data for a given node, nodes or application as shown in block 500. As shown in block 502, part of the input data that the server 408 desires is deletion control management data which includes data representing, for example, the name of the node to be controlled, the selected group of nodes to be controlled, application identification data, such as data representing certain software applications for which a particular deletion process is to be applied, data representing file types or file names or any other suitable deletion control management data to represent the category of information for which a particular type of deletion preprocessing mechanism is to be used. As shown in block 504, the centralized deletion control data provider receives the deletion control data and communicates the deletion control data in accordance with the deletion control management data as shown in block 506. For example, the centralized deletion control data provider 402 will transmit the deletion control data to the appropriate nodes identified by the given node names. The deletion control data provider 402 may also store the deletion control data in any suitable directory or intermediate node with a directory. As shown in block 508, a respective node or application receives the deletion control data sent by a centralized deletion control data provider 402 and evaluates the deletion control data to confirm that it is valid for the given node. For example, if the node is not authorized to perform the deletion process for security reasons, the node may notify the centralized data deletion control provider that there has been an error in assigning control data to the particular node. As previously described, the secure data deletion module in the node may be any of those previously described so, for example, the secure data deletor provides the continue deletion data to notify a first deletion system, such as an operating system, to continue associated deletion process once the secure data deletor has finished its process. Likewise, the secure data deletor may overwrite desired data to be deleted or encrypt the desired data, or overwrite the desired data to be deleted and store the encrypted data as previously described.

A difference in operation from the previously described embodiments is that the system invoked preprocess secure data deletor selectively applies a system or centralized invoked preprocess deletion operation to data based on deletion control data received from server 408. This is in contrast to the non-centralized operation previously described where a given user has control over aspects of the system invoked secure data deletor.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A data deletion method comprising:
   detecting data deletion notification data representing a desire to delete data; and
   providing a system invoked deletion process that modifies the desired data to be deleted in response to the detected data deletion notification data, wherein modifying includes:
   encrypting the desired data to be deleted;
   overwriting the desired data to be deleted; and
   storing the encrypted data.

2. The data deletion method of claim 1 wherein modifying includes overwriting the desired data to be deleted.

3. The data deletion method of claim 1 including evaluating storage media status data representing usable storage media that can allow overwriting of data to facilitate deletion of data.

4. The data deletion method of claim 1 wherein modifying includes overwriting the desired data a plurality of times.

5. The data deletion method of claim 1 including the step of selectively applying the system invoked deletion process to data based on deletion control data.

6. The data deletion method of claim 1 including providing centralized deletion control data from a centralized provider to a plurality of nodes.

7. The data deletion method of claim 6 wherein the deletion control data includes at least one of: memory identification data, directory identification data, security degree data and encryption enabling data.

8. The data deletion method of claim 6 including providing a user interface to enter the deletion control data.

9. A data deletion method comprising:
   detecting data deletion notification data representing a desire to delete data for a first deletion system; and
   utilizing a system invoked pre-process deletion process, by a second deletion system, that modifies the desired data to be deleted in response to the detected data deletion notification data.

10. The data deletion method of claim 9 including providing, for the first deletion system, continue deletion data to notify the first deletion system to continue an associated deletion process.

11. The data deletion method of claim 9 wherein modifying includes overwriting the desired data to be deleted.

12. The data deletion method of claim 9 wherein modifying includes:
    encrypting the desired data to be deleted;
    overwriting the desired data to be deleted; and
    storing the encrypted data.

13. The data deletion method of claim 9 including providing storage media status data representing usable storage media that can allow overwriting of data to facilitate deletion of data.

14. The data deletion method of claim 9 wherein modifying includes overwriting the desired data a plurality of times.

15. The data deletion method of claim 9 including the step of selectively applying the system invoked deletion process to data based on deletion control data.

16. A data deletion system comprising:
    a deletion detector operatively responsive to data deletion notification data representing a desire to delete data;
    a system invoked secure data deletor, operatively coupled to the deletion detector, that modifies the desired data to be deleted in response to the detected data deletion notification data, wherein modifying includes:
    encrypting the desired data to be deleted;
    overwriting the desired data to be deleted; and
    storing the encrypted data.

17. The data deletion system of claim 16 wherein modifying includes overwriting the desired data to be deleted.

18. The data deletion system of claim 16 including a storage media status data generator wherein the storage media status data represents usable storage media that can allow overwriting of data to facilitate deletion of data.

19. The data deletion system of claim 16 wherein modifying includes overwriting the desired data a plurality of times.

20. The data deletion system of claim 16 including a deletion control data generator, operatively coupled to the system invoked secure data deletor, and wherein the system invoked secure data deletor selectively applies a system invoked deletion process to data based on the deletion control data.

21. The data deletion system of claim 16 including a centralized deletion control data provider and wherein the system invoked secure data deletor is a computer node operatively coupled to receive deletion control data from the centralized deletion control data provider.

22. The data deletion system of claim 21 wherein the deletion control data includes at least one of: memory identification data, directory identification data, security degree data and encryption enabling data.

23. A data deletion system comprising:

a deletion detector operatively responsive to data deletion notification data representing a desire to delete data for a first deletion operation;

a centralized deletion control data provider that provides deletion control data;

a system invoked pre-process secure data deletor associated with a second deletion operation, operatively coupled to the deletion detector and to the centralized deletion control data provider, that modifies the desired data to be deleted in response to the detected data deletion notification data and the deletion control data.

24. The data deletion system of claim 23 wherein the deletion control data includes at least one of: memory identification data, directory identification data, security degree data and encryption enabling data.

25. The data deletion system of claim 23 including a continue deletion data provider to notify the first deletion system to continue an associated deletion process.

26. The data deletion system of claim 23 wherein modifying includes overwriting the desired data to be deleted.

27. The data deletion system of claim 26 wherein modifying includes:

encrypting the desired data to be deleted;

overwriting the desired data to be deleted; and storing the encrypted data.

28. The data deletion system of claim 23 wherein the system invoked pre-process secure data deletor selectively applies a system invoked pre-process deletion operation to data based on deletion control data.

29. The data deletion system of claim 23 wherein the centralized deletion control data provider provides a certificate containing the deletion control data.

30. A data deletion method comprising:

detecting data deletion notification data representing a desire to delete data; and providing a system invoked deletion process that modifies the desired data to be deleted in response to the detected data deletion notification data, including the step of selectively applying the system invoked deletion process to data based on deletion control data.

31. The data deletion method of claim 30 including providing centralized deletion control data from a centralized provider.

32. The data deletion method of claim 30 wherein the deletion control data includes at least one of: memory identification data, directory identification data, security degree data and encryption enabling data.

33. The data deletion method of claim 30 including providing a user interface to enter the deletion control data.

34. A data deletion method comprising:

detecting data deletion notification data representing a desire to delete data; and providing a system invoked deletion process that modifies the desired data to be deleted in response to the detected data deletion notification data, including evaluating storage media status data representing usable storage media that can allow overwriting of data to facilitate deletion of data.

35. A data deletion system comprising:

a deletion detector operatively responsive to data deletion notification data representing a desire to delete data;

a system invoked secure data deletor, operatively coupled to the deletion detector, that modifies the desired data to be deleted in response to the detected data deletion notification data, including a storage media status data generator wherein the storage media status data represents usable storage media that can allow overwriting of data to facilitate deletion of data.

* * * * *